Sept. 22, 1959     W. B. PEMBERTON     2,905,257
CULTIVATING MACHINE

Filed April 4, 1957

INVENTOR
WILBUR B. PEMBERTON,
BY
ATTORNEY

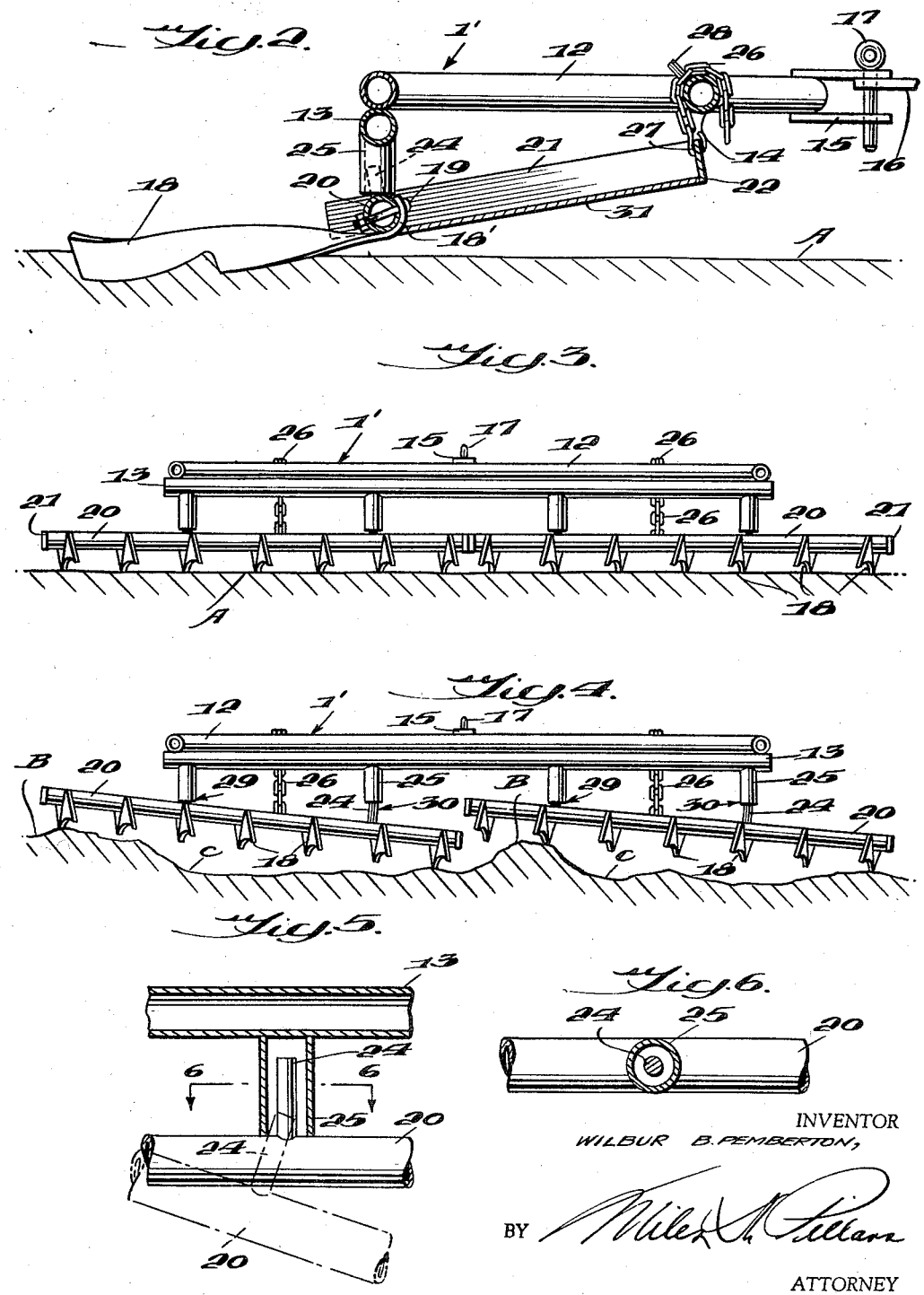

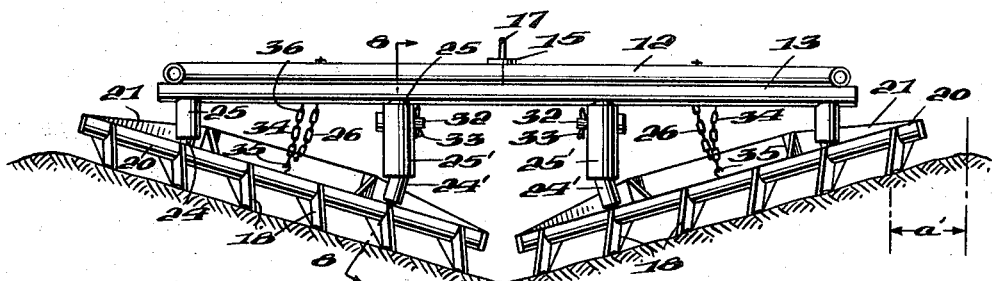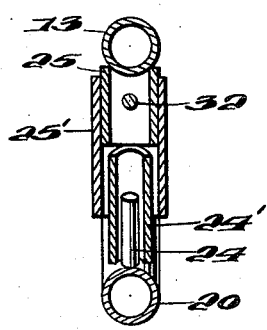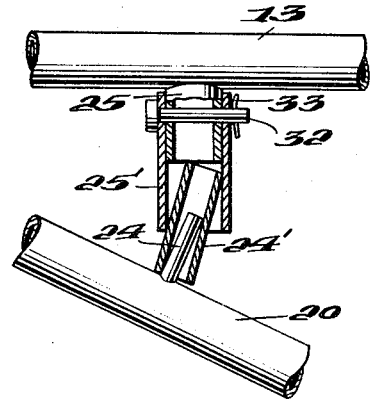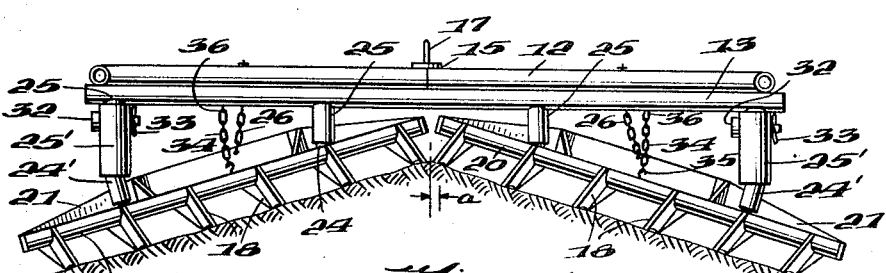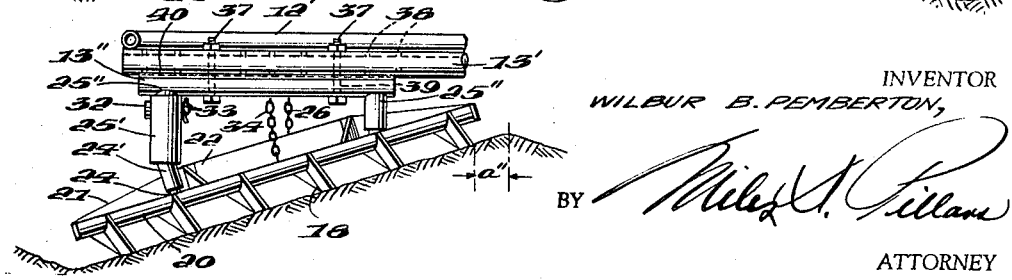

United States Patent Office 2,905,257
Patented Sept. 22, 1959

2,905,257

CULTIVATING MACHINE

Wilbur B. Pemberton, Seffner, Fla.

Application April 4, 1957, Serial No. 650,613

12 Claims. (Cl. 172—620)

This invention relates to cultivating machines, and in particular, to improvements in harrows and pulverizers provided with gangs or a plurality of pulverizing units.

In cultivating and pulverizing soil it is desirable that the soil be broken up into fairly uniformly small particles, and it is particularly desirable that large clods be broken and leveled so as to minimize erosion and facilitate the planting and cultivating of crops. In accordance with this invention, gangs of cultivating elements, such as harrow blades, are mounted upon a supporting frame which is connected to a main power-transmitting frame by an improved drag and force transmitting coupling which causes the runner blades to exert a greater force on clods or uneven hills and elevations in the ground than upon the lower portions of the ground, thus tending to produce a general leveling of the ground surface and a breaking up of large clods of earth. This forcing transmitting coupling between the cultivating element support frame and the main power-transmitting frame comprises telescopically arranged tubular connecting elements mounted on each of the frames, and loosely arranged within each other to allow a limited amount of relative pivotal movement between the main frame and the supporting frame, and also to provide for a predetermined maximum relative transverse rocking between these frames.

An object of this invention is to provide an improved cultivating machine having a main power-transmitting frame and a relatively movable cultivating element supporting frame connected to the main frame by an improved coupling arrangement.

Another object of this invention is to provide an improved cultivating machine having a main power-transmitting frame and a cultivating element supporting frame adapted to carry a plurality of cultivating elements transversely thereof, and coupled to the main frame to provide for relative rocking therebetween for producing clod breaking and soil leveling effects.

A further object of this invention is to provide an improved cultivating machine having a main power-transmitting frame and a pair of cultivating element supporting frames transversely spaced and coupled to the main frame for special types of cultivation by providing for relative transverse rocking between the main frame and the cultivating element supporting frame and for a predetermined relative angularity between the cultivating element supporting frame and the main frame under normal level main frame operating conditions.

Further objects and advantages of this invention will become apparent, and the invention will be better understood from the following description referring to the accompanying drawings, and the features of novelty which characterize this invention will be pointed out with particularity in the claims annexed to and forming a part of this specification.

In the drawings:

Fig. 2 is a sectional view taken along line 2—2 of Fig. 1;

Fig. 3 is a rear end elevational view of the cultivating machine shown in Fig. 1, illustrating the cultivating element supporting frames on substantially level soil;

Fig. 4 is a rear end elevational view, similar to Fig. 3, illustrating the position of the cultivating element supporting frames on relatively rough, uneven soil;

Fig. 5 is a fragmentary view partially in section, of a frame coupling element, illustrating, in solid lines, the relative position of the telescopic coupling elements in normal level frame positions, and illustrating in phantom the relative frame and coupling element positions assumed when the frames are angularly disposed, as shown in Fig. 4;

Fig. 6 is a sectional view taken along line 6—6 of Fig. 5;

Fig. 7 is a rear end elevational view of a cultivating machine, similar to that shown in Figs. 1–4, provided with a modified coupling between the main and cultivating element supporting frames to provide for cultivating plants which are grown in a well-known manner on parallel hills;

Fig. 8 is a sectional view, taken along line 8—8 of Fig. 7, illustrating the modified telescopic coupling element used in this construction;

Fig. 9 is an enlarged fragmentary view, partially in section, of the modified telescopic frame coupling shown in Figs. 7 and 8, illustrating the manner in which the elements are connected together and showing how bearing forces are transmitted between the different parts of the coupling;

Figure 1:
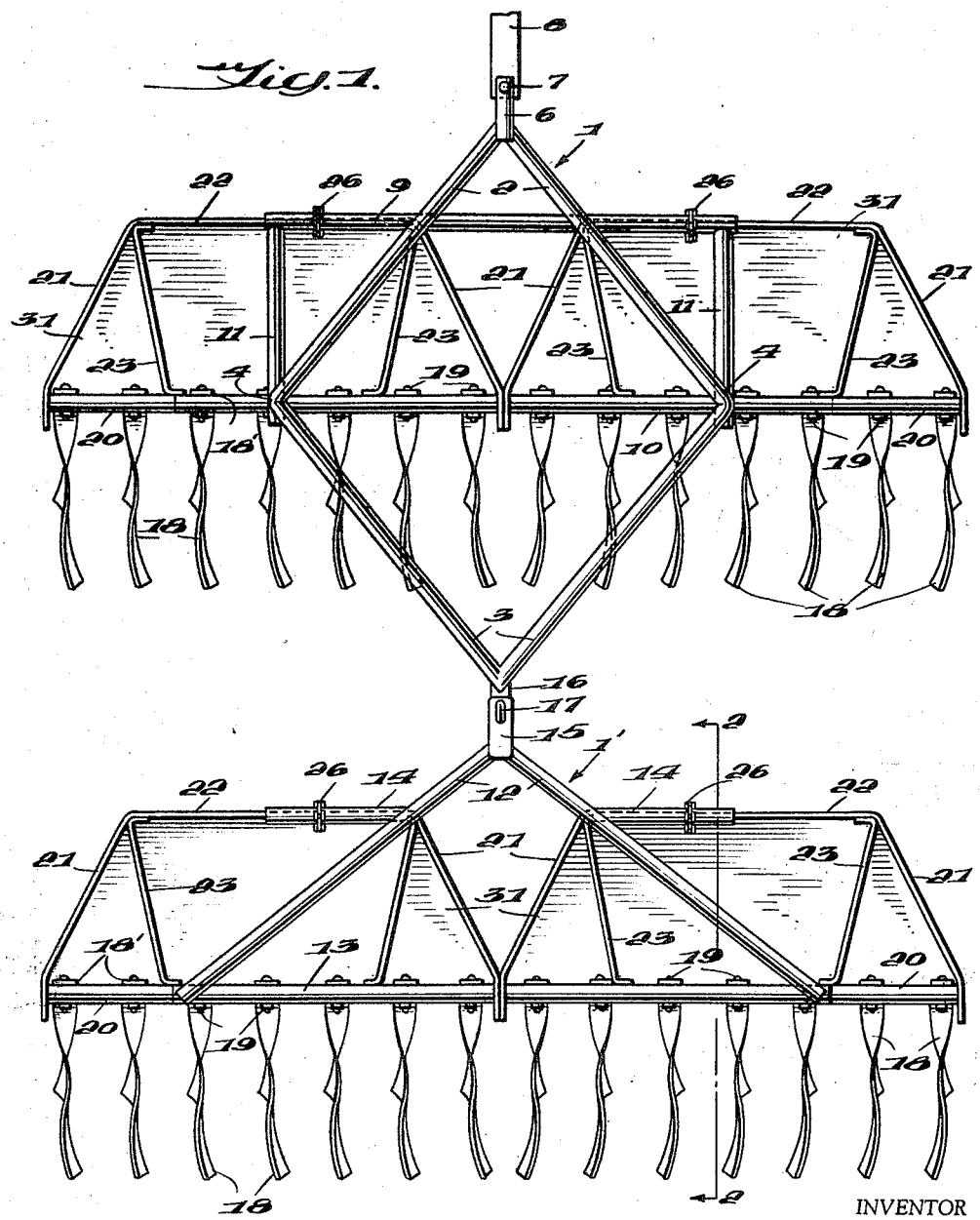
Fig. 1 is a plan view of a blade harrow incorporating an embodiment of this invention.

Fig. 10 is a rear end elevational view of a cultivating machine provided with modified coupling members, similar to those of Figs. 7–9, arranged for cultivation of the soil on the sides of rows of hills preparatory to planting on soil prepared in this well-known manner or for cultivating such hills when the plants growing thereon are relatively small, and Fig. 11 is a fragmentary rear end elevational view of a modification of the cultivating machine shown in Figs. 7–10.

Referring to the drawings, an embodiment of this invention is shown in Figs. 1–6 in the form of a cultivating machine provided with two major sets of cultivating elements arranged in tandem, each of which is provided with a main power-transmitting frame coupled to two gangs of substantially conventional harrow blades. Details of the two main power-transmitting frames are best shown in Figs. 1 and 2. The forward main frame and the rear main frame may be constructed of any suitable structural material and are shown constructed slightly different from each other, but both incorporating the same basic improvements of this invention.

The forward main power-transmitting frame 1 comprises a diamond shaped central frame having forward drag elements 2 and rear drag elements 3 connected together at the transversely opposite corners 4 and 5. The front ends of the forward drag elements 2 are suitably connected together and to suitable coupling tongues 6, formed with apertures therein, which are adapted to be engaged by a coupling pin 7 for coupling of the main power-transmitting frame 1 to a suitable source of power 8, such as a tractor. In this structure, the main frame 1 is provided with a transversely extending blade depth adjusting bar 9 and a rear transversely extending drag bar 10, which are suitably connected together by longitudinally extending reinforcing side bars 11.

The power-transmitting frames 1 and 1' are coupled in a manner so as to cause the rear gang of harrows or other cultivating members to track in the same path as the forward cultivating members. This has been found to be desirable for producing a substantially uniform cultivation and pulverization of the soil. In order to obtain this desirable result, the rear main power-transmitting frame 1' is constructed with two forwardly extending drag elements 12, secured together at their front ends and secured at the rear ends thereof to a transversely extending rear drag bar 13 so as to form a substantially rigid triangular central frame. This central frame is secured adjacent to the forward end thereof to two transversely extending blade depth adjusting bars 14, and is provided with a pair of suitable coupling tongues 15, welded or otherwise secured to the front end of the drag elements 12 and formed with apertures therein for coupling to the forward main frame. A coupling tongue 16 is secured to the rear juncture of the rear drag elements 3 of the forward main frame and is formed with a suitable aperture therein adapted to be aligned with the apertures in the coupling tongues 15 of the rear main frame and a power transmitting coupling pin 17 extends through the coupling apertures in the tongues 15 and 16 for pivotally coupling the two main frames and for transmitting drag forces therebetween. The spacing between the coupling tongues 15 is substantially greater than the thickness of the coupling tongue 16, so that the tongue 16 is allowed a limited amount of relative vertical movement between the tongues 15, so as to minimize the transmission of vertical forces between the two main frames, which thus allows the two main sets of ganged harrow blades to function at their maximum efficiency and substantially independently of relative rocking movement of each gang of blades in the forward and rear sets.

In the cultivating machine illustrated in Figs. 1–6, the leveling and pulverization or cultivating of the soil is shown as being accomplished through the medium of four gangs of harrow blades 18, all of substantially the same configuration and incorporating any suitable conventional clod breaking and soil pulverizing curves, angles, and teeth. These blades 18 are illustrated as assembled in four similar gangs of seven blades each, mounted upon suitable supporting frames which are coupled in a novel manner to the main power transmitting frames to provide a more efficient clod breaking and soil leveling cultivating machine.

Each of the blades 18 is formed with a forwardly curved end 18' which is secured in any suitable manner, as by bolt 19, to the underside of a transversely extending supporting frame bar 20. This supporting frame bar 20 forms parts of the cultivating machine supporting frame, and is secured at the ends thereof to forwardly extending arms 21 of this frame, formed integral with a transversely extending front frame bar 22. Reinforcing braces 23 extend between and are suitably secured to the front corners of the frame between the arms 21 and the front frame bar 22 and to the rear supporting frame bar 20. This provides a very sturdy supporting frame structure to which the harrow blades 18 are rigidly secured.

In order to transmit tractive effort and suitably to distribute bearing weight from the main power-transmitting frames to the harrow blades 18 for assuring maximum efficiency in breaking up clods and for properly leveling and pulverizing the soil, a novel coupling and blade depth adjusting arrangement is provided between the main frames and the supporting frames. This arrangement includes the provision of frame connecting members comprising a pair of rod-like connecting elements 24 extending upwardly and mounted in transversely spaced relation on the supporting frame adjacent the rear thereof. These connecting elements 24 may suitably be formed of rods or bars which are welded or otherwise rigidly secured to the upper side of the transversely extending supporting frame bar 20. A pair of cooperating tubular connecting elements 25 are mounted in transversely spaced downwardly extending relation on each side of the longitudinal central line of each main frame adjacent to the rear thereof. These tubular connecting elements 25 may be conveniently mounted by welding or otherwise rigidly securing the upper ends thereof to the underside of the rear drag bar 13 of the main power transmitting frames, as is more clearly shown in Fig. 2.

In the assembled operating relationship of the main and supporting frames, the tubular connecting elements 25 are loosely telescopically arranged over the supporting frame connecting elements 24, with a normal weight transmitting engagement between the lower edges of the tubular connecting elements 25 and the supporting frame bar 20, as is more clearly shown in Figs. 2 and 5. The telescopically arranged connecting elements 24 and 25 of each force transmitting frame connecting member are made of such size relative to each other as to provide for a limited relative movement in all transverse directions between these elements. This allows a limited amount of longitudinal pivoting movement of the supporting frame relative to the main frame, as shown in Fig. 2, and provides for relative transverse rocking between the main and supporting frames, as shown in Figs. 4 and 5, so that the harrow blades and the supporting frame can accommodate themselves to some rather substantial irregularities in the soil under cultivation.

It is desirable that the depth of penetration of the harrow blades into the soil may be adjusted to suit different types of soil. In order to provide such adjustment of the depth of penetration of the harrow blades, the front ends of the supporting frames are adapted to be raised or lowered relative to the rear bar 20 of the supporting frame, so as to adjust the vertical angularity of the harrow blades 18 relative to the main frames. This adjustable connection between the main and supporting frames preferably is formed by a suitable chain member 26, swingably secured to the forepart of the supporting frame, as by a hook 27 extending through a suitable aperture in the front supporting frame bar 22, with a link of the chain 26 arranged over a suitable pin 28 secured to the upper side of a main frame blade-depth adjusting bar. The vertical angularity of the supporting frame, and, therefore, of the harrow blades 18, can be regulated by raising and lowering the front supporting frame bar 22 by adjusting the length of chain 26 extending between the pin 28 and the connection of the hook 27 to the supporting frame front bar 22. Thus, a shortening of this length of chain 26 raises the front end of the supporting frame and causes the harrow blades 18 to cut more deeply into the soil; and a lengthening of the chain 26 between the pin 28 and the supporting frame bar 22, lowers the front end of the supporting frame and permits the harrow blade 18 to assume a more generally horizontal position, resulting in a relatively shallower depth of penetration into the soil.

Where the soil is relatively level and fairly well pulverized, the supporting frames will remain substantially level and parallel to the main frame, as shown in Fig. 3. When the soil is relatively rough and uneven, as illustrated in Fig. 4, the improved connecting structure, which couples the harrow blade supporting frames to the main frame, allows the supporting frames to rock transversely of the main frame, as shown in this figure, such that the telescopically arranged connecting elements 24 and 25 remain substantially closed as the harrow blades pass over clods or other elevations in the soil, as shown at 29, and the other connecting elements 24 and 25 will extend telescopically, as shown at 30. These two relative positions of the connecting elements are respectively shown in solid and phantom lines in Fig. 5. As is clearly seen in this figure, bearing weight is transmitted in the position of the connecting elements shown in solid lines, which corresponds to the positions 29 in Fig. 4; whereas substantially no bearing forces are transmitted through the connecting elements 24 and 25 in the position shown in phantom lines in Fig. 5, which corresponds to the positions 30 in Fig. 4. Thus, when a cultivating machine incorporating the improved structure of this invention passes over elevations or clods in the soil, the bearing weight is shifted from a telescopically extended connecting member to a telescopically closed force-transmitting connecting member, and a greater force is applied to the clod or elevated portion of earth than to the remainder of the earth engaged by the harrow blades, whereby a greater clod breaking and leveling force is exerted upon the clods or raised soil than upon the adjacent soil. As the harrow blades pass over irregularities and over relatively level ground, the supporting frames are free to rock transversely and to pivot longitudinally to provide all of the necessary adjustments of the supporting frame in relation to the main power-transmitting frame. Such relative movements are further freely assured by the use of the chain 26 to connect the forward frame bar 22 to the main frame, as this chain connection provides for relative swinging and pivoting of the supporting frame and the main frame.

In most instances, it will be found desirable to provide an auxiliary clod breaker or leveling beam on the supporting frames. This clod breaker or leveling beam may comprise any suitable structure and can conveniently be formed by a rigid plate or beam 31 secured to the underside of the supporting frame in any suitable manner, as by welding to the lower edge of the front frame bar 22, the arms 21 and the braces 23. The operation of such a clod breaker or leveling beam is well-known, and it merely tends to flatten out irregularities in the surface of the soil. It will thus be seen that this improved cultivating machine provides a relatively simple, rugged construction for more effectively breaking up clods and pulverizing soil which is being cultivated, while simultaneously effecting a general leveling of the cultivated surface of the soil.

In Figs. 7–10, a modification of the improved cultivating machine previously described is illustrated which is particularly useful for cultivating plants which are grown on parallel hills. With plantings of this type, especially where the plants grow as vines which creep over the ground, it is necessary that the cultivation does not reach as near the top of the hill as the vines grow longer, in order to avoid damaging the vines. It is also desirable that the cultivator of the soil should not tend to level off the hills or leave a relatively narrow hill in the center between relatively wide troughs. In accordance with the present invention, the desired cultivation of such hills is obtainable by providing a special connection of the harrow blade supporting frames to the main frames in a predetermined normal vertical angular relationship. That is, these two frames are arranged to have a normal vertical angularity therebetween under normal bearing weight distribution of the main frame upon the blade supporting frames so that the depth of penetration of the harrow blades into the soil will be substantially equal along all parts of a hill. This provides for a substantially uniform cultivation of the soil.

As shown in Fig. 10, the supporting frames are adapted to be connected to the main frames through telescopically arranged connecting members, similar to those illustrated in Figs. 1–6. In this arrangement, the supporting frames are shown connected to the main frames for cultivating hills when vines or plants thereon are relatively young. Under these conditions, almost all of the surface of the hills can safely be cultivated. As shown, a pair of connecting elements 24 is mounted on the rear frame bar 20 of each supporting frame and cooperating telescopically arranged connecting elements 25 are mounted on the main frame drag bar 13, as in the previously described cultivating machine structure. The desired angular frame relationship is obtained by providing an axially extended weight bearing arrangement to correspondingly positioned sets of connecting elements 24 and 25 of each pair comprising tubular sleeve connecting elements 24' and 25' arranged respectively over the elements 24 and 25.

When it is practical and desirable to cultivate substantially all the surface of the hills, as shown in Fig. 10, these tubular sleeve connecting elements 24' and 25' are arranged over the outer sets of connecting elements 24 and 25 of each pair. The tubular element 24' preferably is formed on a diameter slightly smaller than the diameter of the element 25, but large enough so that bearing weight can be transmitted from the lower edge of the element 25 to the upper edge of the element 24', as is more clearly shown in Figs. 8 and 9. The inner diameter of the tubular element 24' should be made slightly larger than the outer diameter of the element 24, in order to provide for a limited amount of relative tilting therebetween. The tubular sleeve element 25' is adapted to be fitted over the connecting element 25 and to be secured thereto in any suitable manner for ready connection and disconnection. This can conveniently be provided by a pin 32 extending through aligned openings in the tubular sleeve element 25' and the element 25. This pin can be secured in position in a readily demountable manner by any suitable means, as by a cotter pin 33 arranged in engagement with a suitable opening in the end of the pin.

As is more clearly shown in Fig. 9, bearing weight is transferred from the main frame to the supporting frame through the main frame drag bar 13, the connecting member 25, to the tubular sleeve connecting element 24', the supporting frame bar 20, and to the harrow blades 18. In this Fig. 10 arrangement, bearing weight is transferred from a main frame to the inner part of a supporting frame directly through the connecting elements 24 and 25, as in the previously described machine, illustrated in Figs. 1–6, so that a substantially even distribution of bearing weight is transmitted from the main frame to each supporting frame through the connecting members.

Adjustment of the depth of penetration of the harrow blades into the soil is provided for by connecting the front end of the supporting frame through an adjustable chain 26, in the same manner as explained with reference to the machine shown in Figs. 1–6. In the present modification it is desirable to provide a safety tie member between the rear of the main and supporting frames in order to prevent separation of the connecting members when the machine turns at the end of a hill and the supporting frames pass over substantially level ground under which conditions the raised sides of the supporting frames are suspended in the air. This safety tie member preferably is in the form of a chain 34, which can conveniently be secured to the rear center of the supporting frame by a hook 35, mounted on the rear frame bar 20, and secured to the drag bar 13 of the main frame by another hook 36. The length of the chain 34 preferably is such that there is a certain amount of slack therein when the support frame is in soil cultivating position and the harrow blades are in engagement with the sides of the hills, as shown in Fig. 10. This slack in the chain 34 is needed in order to allow for relative pivoting and rocking between the main and supporting frames, as may be required by slight irregularities in the surfaces of the hills.

As the vines on the hills grow, they will extend over the sides of the hills, so that it is not possible to cultivate the soil as high up on the sides of the hills as when the plants were young. With this improved construction of the cultivating machine, it is only necessary to remove the pins 32, which secure the tubular sleeve elements 25' over the outer connecting elements 25, remove the tubular sleeve elements 25' from the outer connecting elements 25, place them over the inner connecting elements 25 and secure them in position by pins 32, as shown in Fig. 7. With this arrangement the harrow is drawn along the trough between hills, and the space between the top of the hills and the outermost harrow blade is relatively much greater than when the supporting frames are arranged as shown in Fig. 10 and the harrow is drawn over the center of the hills. This is clearly shown by a comparison of the distances *a* and *a'* in Figs. 10 and 7, respectively.

The remainder of the structure of the main and supporting frames can be essentially the same as that disclosed in Figs. 1–6, which provides for adjusting the depth of penetration of the harrow blades 18 and also for smoothing the surface of the hills by a leveling beam, similar to that shown in Figs. 1 and 2. The structure of the main and supporting frames also can be essentially the same as that previously disclosed in Figs. 1–6 and, if desired, shorter harrow blades 18 can be used as the plants grow, so that a relatively wider crest of uncultivated earth will be left along the ridges of the hills than when cultivating the younger plants. In this manner, the provision of connecting members between the main and supporting frames which are adjustable axially or lengthwise thereof, for axially adjusting the position of the normal weight transmitting engagement between the elements forming the connecting members and thereby adjusting the relative transverse normal angularity between the main and supporting frames, provides an improved cultivating machine which is readily adaptable to the cultivation of plants normally grown in parallel hills and a machine which can be effectively used to cultivate such plants during different periods of their growth.

In Fig. 11, a further modification of the improved cultivating machine, previously described, is illustrated which is particularly adapted to the cultivation of plants which are grown in parallel hills. In this construction, the harrow blade supporting frames, including the supporting frame bar 20 and the connecting arms 21, front frame bar 22, and related bracing elements, to which frames the harrow blades 18 are secured, may be of the conventional type as shown in the previously described constructions.

In this structure, the main frame is formed of drag members substantially the same as those illustrated and described with reference to Figs. 7–10, in which forwardly extending drag elements 12' are suitably secured at their rear ends to a rear drag bar 13'. This rear drag bar 13' is demountably secured to a supplementary drag frame by a plurality of bolts 37 which extend through sets of openings 38 spaced longitudinally of the rear drag bar 13' and through two pairs of aligned bolt holes or openings 39 in a supplementary frame bar 13''. The supplementary frame drag bar 13'' is adapted to be drawn up tightly into engagement with the lower side of the main frame rear drag bar 13' by the bolts 37, and a pair of longitudinally extending spaced rods 40 are secured to the supplementary frame drag bar 13'' on each side of the bolt holes 39 through this bar, so as to provide for firmly nesting the main frame rear drag bar 13' between these rods 40.

The supplementary drag frame is provided with tubular connecting elements 25'', similar to the elements 25 of the previously described constructions, which are adapted to extend over connecting elements secured to the harrow blade supporting frame for transmitting drag forces therebetween. The harrow blade supporting frames are adapted to be maintained in a desired angular position relative to the main frame of the cultivating machine, so as properly to cultivate the sides of the hills in which the vegetables or vines are planted, by auxiliary tubular connecting elements 25' arranged over the connecting elements 25'' and suitably secured thereto by a connecting pin 32 and a cotter pin 33. The supplementary connecting element 25' is adapted to be loosely slidably arranged over a second supplementary tubular connecting element 24' which fits loosely over a connecting element 24 rigidly secured to the harrow supporting frame bar 20, as in the constructions previously described. The inner rear end of the harrow supporting frame is connected to the main frame through another tubular connecting element 25' secured to the supplementary frame drag bar 13'' and loosely slidably arranged over another connecting element 24 adjacent the inner end of the harrow supporting frame bar 20. Suitable chains 34 and 26 connect the harrow supporting frame to the main frame as in the construction illustrated in Figs. 7–10 and assure against accidental disconnection of the harrow supporting frame from the main frame. The plurality of spaced openings 38 in the main frame rear drag bar 13' provide for securing the supplementary drag frame bar 13'' in a plurality of transverse positions relative to the center of the main frame so that the distance between the center of the main frame, which corresponds to the center of a hill which is being cultivated, to the inner edge of the innermost harrow blade can be varied by varying the holes 38 through which the bolts 37 extend in securing the supplementary frame drag bar 13'' to the main frame drag bar 13'. In this manner the distance *a''* can be increased as the vegetables or vines grow and cover a larger portion of the top of the hills. This embodiment of the improved cultivating machine will be found particularly useful where it is required that the soil be cultivated periodically as the vegetables or vines grow and cover a larger area of the top of the hills. With this construction, a simple adjustment of the connection of the supplementary frame drag bar 13'' in relation to the main frame rear drag bar 13' can be made to accommodate the growth of the crops on the tops of the hills which are being cultivated.

Particular embodiments of this invention have been shown and described as illustrative of this invention. Modifications thereof will occur to those skilled in the art. It is to be understood, therefore, that this invention is not to be limited to the particular details disclosed, and that the appended claims are intended to cover all modifications which do not depart from the spirit and scope of this invention.

I claim:

1. A cultivating machine having a main power transmitting frame, a plurality of cultivating element supporting frames, a gang of cultivating elements on each of said supporting frames, and means for connecting together said frames including sets of frame-connecting members comprising a pair of connecting elements extending upwardly and mounted in transversely spaced relation on each of said supporting frames adjacent to the rear thereof and a pair of cooperating tubular connecting elements extending downwardly and mounted in correspondingly transversely spaced relation on said main frame adjacent to the rear thereof, each of said main frame frame connecting elements being loosely telescopically arranged over one of said supporting frame-connecting elements and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames.

2. A cultivating machine having a main power transmitting frame, a plurality of cultivating element supporting frames, a gang of cultivating elements on each of said supporting frames, means for connecting together said frames including sets of frame-connecting members comprising a pair of connecting elements extending upwardly and mounted in transversely spaced relation on each of said supporting farmes adjacent to the rear thereof and a pair of cooperating tubular connecting elements extending downwardly and mounted in transversely spaced relation on said main frame adjacent to the rear thereof, each of said main frame connecting elements being loosely telescopically arranged over one of said supporting frame connecting elements and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, and means for connecting the forepart of each of said supporting frames to said main frame allowing a limited amount of relative movement therebetween in all directions.

3. A cultivating machine having a main power transmitting frame, a plurality of cultivating element supporting frames, a gang of cultivating elements on each of said supporting frames, means for connecting together said frames including sets of frame-connecting members comprising a pair of connecting elements extending substantially vertically upwardly and mounted in transversely spaced relation on each of said supporting frames adjacent to the rear thereof and a pair of cooperating tubular connecting elements extending substantially vertically downwardly and mounted in transversely spaced relation on said main frame adjacent to the rear thereof, each of said main frame connecting elements being loosely telescopically arranged over one of said supporting frame connecting elements with a normal level weight-transmitting engagement thereon, and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight of said main frame on said supporting frame is relatively shifted from a telescopically extended force-transmitting frame-connecting member to a telescopically closed force-transmitting frame-connecting member on occurrence of relative transverse rocking between said main and supporting frames, and means adjustably and swingably connecting the forepart of each of said supporting frames to said main frame for adjusting the depth of penetration of said cultivating elements and for providing a connection between said frames allowing a limited amount of relative movement therebetween in all directions.

4. A cultivating machine having a main power transmitting frame, a cultivating element supporting frame, a gang of cultivating elements on said supporting frame, means for connecting together said frames including frame-connecting members comprising a pair of connecting elements extending upwardly and mounted in transversely spaced relation on said supporting frame adjacent to the rear thereof and a pair of cooperating tubular connecting elements extending downwardly and mounted in correspondingly transversely spaced relation on said main frame adjacent to the rear thereof, each of said main frame connecting elements being loosely telescopically arranged over one of said supporting frame connecting elements and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, and means adjustably and swingably connecting the forepart of said supporting frame to said main frame for adjusting the depth of penetration of said cultivating elements and for providing a connection between said frames allowing a limited amount of relative movement therebetween in all directions.

5. A cultivating machine having a main power transmitting frame, a plurality of cultivating element supporting frames, a gang of cultivating elements on each of said supporting frames, means for connecting together said frames including sets of frame-connecting members comprising a pair of connecting elements extending upwardly and mounted in transversely spaced relation on each of said supporting frames adjacent to the rear thereof and a pair of cooperating tubular connecting elements extending downwardly and mounted in transversely spaced relation on said main frame adjacent to the rear thereof, each of said main frame connecting elements being loosely telescopically arranged over one of said supporting frame connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, means for connecting the forepart of each of said supporting frames to said main frame allowing a limited amount of relative movement therebetween in all directions, said connecting elements being adjustable axially thereof for axially adjusting the position of said normal weight-transmitting engagement therebetween and adjusting the relative transverse normal angularity between said main and said supporting frames.

6. A cultivating machine having a main power transmitting frame, a plurality of cultivating element supporting frames, a gang of cultivating elements on each of said supporting frames, means for connecting together said frames including sets of frame-connecting members comprising a pair of connecting elements extending upwardly and mounted in transversely spaced relation on each of said supporting frames adjacent to the rear thereof and a pair of cooperating tubular connecting elements extending downwardly and mounted in transversely spaced relation on said main frame adjacent to the rear thereof, each of said main frame connecting elements being loosely telescopically arranged over one of said supporting frame connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, means for connecting the forepart of each of said supporting frames to said main frame allowing a limited amount of relative movement therebetween in all directions, means for adjusting the axial length of said connecting elements for axially adjusting the position of said normal weight-transmitting engagement therebetween and adjusting the relative transverse normal angularity between said main and said supporting frames, and means including a chain tie member secured to said supporting frame and to said main frame adjacent to the rear thereof for allowing limited relative movement therebetween.

7. A cultivating machine having a main power transmitting frame, a cultivating element supporting frame, a gang of cultivating elements on said supporting frame, means for connecting together said frames including frame-connecting members comprising a pair of connecting elements extending upwardly and mounted in transversely spaced relation on said supporting frame adjacent to the rear thereof and a pair of cooperating tubular connecting elements extending downwardly and mounted in transversely spaced relation on said main frame adjacent to the rear thereof, each of said main frame connecting elements being loosely telescopically arranged over one of said supporting frame connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main supporting frames, and means adjustably and swingably connecting the forepart of said supporting frame to said main frame for adjusting the depth of penetration of said cultivating elements and for providing a connection between said frames allowing a limited amount of relative movement therebetween in all directions, and means for adjusting the axial length of said connecting elements for axially adjusting the position of said normal weight-transmitting engagement therebetween and adjusting the relative transverse normal angularity between said main and said supporting frames.

8. A cultivating machine having a main power transmitting frame, a cultivating element supporting frame, a gang of cultivating elements on said supporting frame, means for connecting together said frames including frame-connecting members comprising a pair of connecting elements extending upwardly and mounted in transversely spaced relation on said supporting frame adjacent to the rear thereof and a pair of cooperating tubular connecting elements extending downwardly and mounted in transversely spaced relation on said main frame adjacent to the rear thereof, each of said main frame connecting elements being loosely telescopically arranged over one of said supporting frame-connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, means adjustably and swingably connecting the forepart of said supporting frame to said main frame for adjusting the depth of penetration of said cultivating elements and for providing a connection between said frames allowing a limited amount of relative movement therebetween in all directions, means for adjusting the axial length of said connecting elements for axially adjusting the position of said normal weight-transmitting engagement therebetween and adjusting the relative transverse normal angularity between said main and said supporting frames, and means including a chain tie member secured to said supporting frame and to said main frame adjacent to the rear thereof for allowing limited relative movement therebetween.

9. A cultivating machine having a main power transmitting frame, said main frame having a rear drag bar with a plurality of bolt holes therethrough spaced longitudinally thereof, a supplementary drag frame having a plurality of bolt holes spaced longitudinally thereof substantially equal to the spacing between certain of the bolt holes in said main frame rear drag bar, means including bolts adapted to extend through the bolt holes in said supplementary drag frame and correspondingly spaced bolt holes in said main frame rear drag bar for securing said supplementary drag frame transversely adjustably to said main frame, a cultivating element supporting frame, a gang of cultivating elements on said supporting frame, and means for connecting together said supplementary drag frame and said cultivating element supporting frame for transmitting drag forces therebetween and providing for a limited longitudinal pivoting movement of said supporting frame relative to said main frame and relative transverse rocking therebetween whereby bearing weight is relatively shifted from cultivating elements on said supporting frame spaced farther from said main frame to cultivating elements nearer to said main frame on occurrence of relative transverse rocking between said main and supporting frames.

10. A cultivating machine having a main power transmitting frame, said main frame having a rear drag bar with a plurality of bolt holes therethrough spaced longitudinally thereof, a supplementary drag frame having a plurality of bolt holes spaced longitudinally thereof substantially equal to the spacing between certain of the bolt holes in said main frame rear drag bar, means including bolts adapted to extend through the bolt holes in said supplementary drag frame and correspondingly spaced bolt holes in said main frame rear drag bar for securing said supplementary drag frame transversely adjustably to said main frame, said supplementary drag frame having a pair of rods extending longitudinally thereof spaced equally on each side of the bolt holes therein and adapted to engage said main frame rear drag bar to provide a nesting engagement therewith when said supplementary drag frame is secured thereto, a cultivating element supporting frame, a gang of cultivating elements on said supporting frame, and means for connecting together said supplementary drag frame and said cultivating element supporting frame for transmitting drag forces therebetween and providing for a limited longitudinal pivoting movement of said supporting frame relative to said main frame and relative transverse rocking therebetween whereby bearing weight is relatively shifted from cultivating elements on said supporting frame spaced farther from said main frame to cultivating elements nearer to said main frame on occurrence of relative transverse rocking between said main and supporting frames.

11. A cultivating machine having a main power transmitting frame, said main frame having a rear drag bar with a plurality of bolt holes therethrough spaced longitudinally thereof, a supplementary drag frame having a plurality of bolt holes spaced longitudinally thereof substantially equal to the spacing between certain of the bolt holes in said main frame rear drag bar, means including bolts adapted to extend through the bolt holes in said supplementary drag frame and correspondingly spaced bolt holes in said main frame rear drag bar for securing said supplementary drag frame transversely adjustably to said main frame, a cultivating element supporting frame, a gang of cultivating elements on said supporting frame, means for connecting together said supplementary and supporting frames including frame-connecting members comprising a pair of connecting elements extending upwardly and mounted in transversely spaced relation on said supporting frame adjacent to the rear thereof and a pair of cooperating tubular connecting elements extending downwardly and mounted in transversely spaced relation on said supplementary frame, each of said supplementary frame-connecting elements being loosely telescopically arranged over one of said supporting frame-connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, means adjustably and swingably connecting the forepart of said supporting frame to said main frame for adjusting the depth of penetration of said cultivating elements and for providing a connection between said frames allowing a limited amount of relative movement therebetween in all directions, means for adjusting the axial length of said connecting elements for axially adjusting the position of said normal weight-transmitting engagement therebetween and adjusting the relative transverse normal angularity between said main and said supporting frames, and means including a chain tie member secured to said supporting frame and to said supplementary frame adjacent to the rear thereof for allowing limited relative movement therebetween.

12. A cultivating machine having a main power transmitting frame, said main frame having a rear drag bar with a plurality of bolt holes therethrough spaced longitudinally thereof, a supplementary drag frame having a plurality of bolt holes spaced longitudinally thereof substantially equal to the spacing between certain of the bolt holes in said main frame rear drag bar, means including bolts adapted to extend through the bolt holes in said supplementary drag frame and correspondingly spaced bolt holes in said main frame rear drag bar for securing said supplementary drag frame transversely adjustably to said main frame, said supplementary drag frame having a pair of rods extending longitudinally thereof spaced equally on each side of the bolt holes therein and adapted to engage said main frame rear drag bar to provide a nesting engagement therewith when said supplementary drag frame is secured thereto, a cultivating element supporting frame, a gang of cultivating elements on said supporting frame, means for connecting together said supplementary and supporting frames including frame-connecting members comprising a pair of connecting elements extending upwardly and mounted in transversely spaced relation on said supporting frame adjacent to the rear thereof and a pair of cooperating tubular connecting elements extending downwardly and mounted in transversely spaced relation on said supplementary frame, each of said supplementary frame connecting elements being loosely telescopically arranged over one of said supporting frame-connecting elements with a normal weight-transmitting engagement thereon and forming therewith a force-transmitting frame-connecting member for transmitting drag forces therebetween, said telescopically arranged connecting elements of each force-transmitting frame-connecting member being of such size as to provide for a limited longitudinal pivoting movement of said supporting frame relative to said main frame and for relative transverse rocking therebetween whereby bearing weight is relatively shifted from a telescopically extended force-transmitting frame-connecting member to a telescopically closed force-transmitting frame-connecting member on occurrence of relative transverse rocking between said main and supporting frames, means adjustably and swingably connecting the forepart of said supporting frame to said main frame for adjusting the depth of penetration of said cultivating elements and for providing a connection between said frames allowing a limited amount of relative movement therebetween in all directions, means for adjusting the axial length of said connecting elements for axially adjusting the position of said normal weight-transmitting engagement therebetween and adjusting the relative transverse normal angularity between said main and said supporting frames, and means including a chain tie member secured to said supporting frame and to said supplementary frame adjacent to the rear thereof for allowing limited relative movement therebetween.

References Cited in the file of this patent

UNITED STATES PATENTS 2,240,889    Hench  ---------------- May 6, 1941